US009129016B1

(12) United States Patent
Boyen

(10) Patent No.: US 9,129,016 B1
(45) Date of Patent: *Sep. 8, 2015

(54) METHODS AND APPARATUS FOR PROVIDING QUERY PARAMETERS TO A SEARCH ENGINE

(71) Applicant: Google Inc., Mountain View, CA (US)

(72) Inventor: Liadan I. Boyen, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/486,716

(22) Filed: Sep. 15, 2014

Related U.S. Application Data

(63) Continuation of application No. 10/971,853, filed on Oct. 22, 2004, now Pat. No. 8,838,562.

(51) Int. Cl.
*G06F 17/30* (2006.01)
*G06F 3/0481* (2013.01)
*G06F 3/0484* (2013.01)

(52) U.S. Cl.
CPC ........ *G06F 17/30861* (2013.01); *G06F 3/0481* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 5,287,199 A | | 2/1994 | Zoccolillo |
| 5,642,522 A | * | 6/1997 | Zaenen et al. ................. 715/246 |
| 5,909,678 A | * | 6/1999 | Bergman et al. ........ G06F 17/30 |
| 6,005,565 A | | 12/1999 | Legall |
| 6,205,261 B1 | * | 3/2001 | Goldberg ....................... 382/310 |
| 6,249,283 B1 | * | 6/2001 | Ur ................................... 715/764 |
| 6,353,825 B1 | | 3/2002 | Ponte |
| 6,366,906 B1 | | 4/2002 | Hoffman |
| 6,463,430 B1 | | 10/2002 | Brady |
| 6,615,248 B1 | | 9/2003 | Smith |
| 6,738,760 B1 | | 5/2004 | Krachman |
| 2001/0016067 A1 | | 8/2001 | Evans |
| 2001/0034734 A1 | | 10/2001 | Whitley |
| 2003/0033288 A1 | | 2/2003 | Shanahan |
| 2003/0112270 A1 | | 6/2003 | Newell |
| 2003/0169292 A1 | * | 9/2003 | Carew et al. .................. 345/760 |
| 2003/0216919 A1 | | 11/2003 | Roushar |
| 2004/0037470 A1 | * | 2/2004 | Simske ......................... 382/229 |

* cited by examiner

*Primary Examiner* — Son T Hoang
(74) *Attorney, Agent, or Firm* — Fish & Richardson P.C.

(57) ABSTRACT

Methods and apparatus for providing query parameters to a search engine are described herein. In one embodiment, the method includes receiving selection information, wherein the selection information indicates search data selected from a graphical user interface. The method also includes creating a query parameter based on the search data and presenting the query parameter to a search engine.

15 Claims, 12 Drawing Sheets

1100

METHODS AND APPARATUS FOR PROVIDING QUERY PARAMETERS TO A SEARCH ENGINE

CROSS-REFERENCE TO RELATED APPLICATIONS

This application is a continuation application of, and claims priority to, U.S. patent application Ser. No. 10/971,853, now U.S. Pat. No. 8,838,562, titled "Methods and Apparatus for Providing Query Parameters to a Search Engine", filed on Oct. 22, 2004. The disclosure of the foregoing application is incorporated herein by reference in its entirety for all purposes.

FIELD

This invention relates generally to the field of data processing and more particularly to the field of search query processing.

BACKGROUND

Search engines can search large databases for information related to specified search queries. Users typically provide search queries through a search engine's graphical user interface (GUI). For example, a user may provide a search query term by entering text into a GUI textbox designated for receiving search queries in textual form. The user may type the query text into the textbox. Alternatively, the user may "copy" text from an application program and "paste" the text into the search engine's textbox. After the search engine receives the query in its textbox, it searches one or more databases for data containing the query term.

Although "pasting" can reduce the amount typing necessary for entering search query terms, pasting is typically limited to applications that offer selectable text. Additionally, pasting application text into a search engine textbox may require numerous keyboard and pointing device commands. For example, pasting text into a search engine text box may require users to 1) activate an application containing selectable text; 2) select text; 3) "copy" the text; 4) activate a search engine; and 5) paste the text into the search engine's query text box. Therefore, it would be useful to have methods and apparatus for providing search query terms to a search engine.

SUMMARY

Methods and apparatus for providing query parameters to a search engine are described herein. In one embodiment, the method includes receiving selection information, wherein the selection information indicates search data selected from a graphical user interface. The method also includes creating a query parameter based on the search data and presenting the query parameter to a search engine.

In one embodiment, the apparatus includes a selection processing unit to receive one or more selection indicators which define a graphical user interface selection area, the input processing unit to fetch image data or text data appearing in the graphical user interface selection area. The apparatus also includes a query creation unit to access the image data or text data and create a query based on the image data or text data, the query creation unit to transmit the query to a search engine.

BRIEF DESCRIPTION OF THE FIGURES

The present invention is illustrated by way of example and not limitation in the Figures of the accompanying drawings in which.

DESCRIPTION OF THE EMBODIMENTS

Methods and apparatus for providing query parameters to a search engine are described herein. This description of the embodiments is divided into four sections. The first section describes a system overview. The second section describes an exemplary operating environment and system architecture. The third section describes system operations and the fourth section describes an exemplary implementation.

Overview

This section provides a broad overview of a system for providing query parameters to a search engine. In particular, this section describes a system for enabling users to provide query parameters to a search engine by selecting an image or text from an application program. In one embodiment, the system can provide query parameters to a search engine in a single mouse click.

Figure 1:
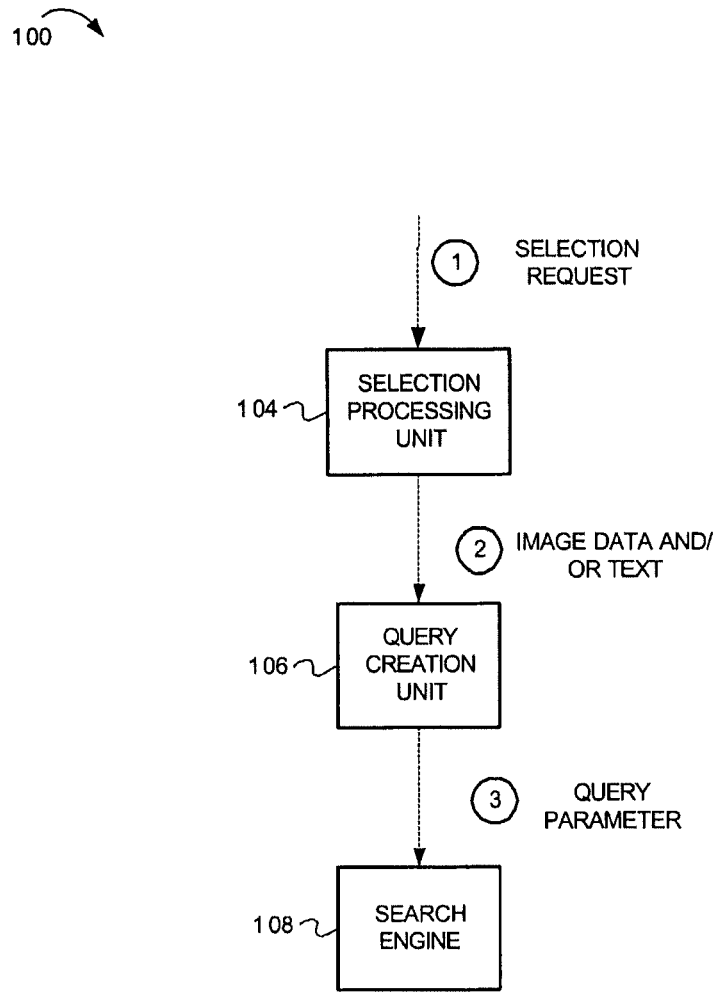
FIG. 1 is a dataflow diagram illustrating data flow in a system for providing query parameters to a search engine, according to exemplary embodiments of the invention.

FIG. 1 is a dataflow diagram illustrating data flow in a system for providing query parameters to a search engine, according to exemplary embodiments of the invention. In FIG. 1, the system 100 includes a selection processing unit 104, query creation unit 106, and search engine 108. The selection processing unit 104 and query creation unit 106 can be software running on a local computer, while the search engine 108 can be software running on a remote computer, according to embodiments of the invention.

The dataflow of FIG. 1 is divided into three stages. At stage 1, the selection processing unit 104 receives selection information, where the selection information indicates search data selected from a graphical user interface. For example, the selection information can define a selection area on a GUI. The selection processing unit 104 fetches image data and/or text associated with the selection area. For example, the selection processing unit 104 can fetch selected text and/or image data appearing in an application program GUI or in an operating system GUI.

During stage 2, the selection processing unit 104 transmits the image data and/or text to the query creation unit 106.

During stage 3, the query creation unit 106 creates a set of one or more query parameters based on the text. The query creation unit 106 transmits the query parameter set to a search engine 108, which commences a search based on the query parameter set.

While this overview describes operations performed by certain embodiments of the invention, other embodiments perform additional operations, as described in greater detail below.

Hardware, Operating Environment, and System Architecture

This section provides an overview of the exemplary hardware and operating environment in which embodiments of the invention can be practiced. This section also describes an exemplary architecture for a system for providing search parameters to a search engine. The operation of the system components will be described in the next section.

Exemplary Hardware and Operating Environment

Figure 2:
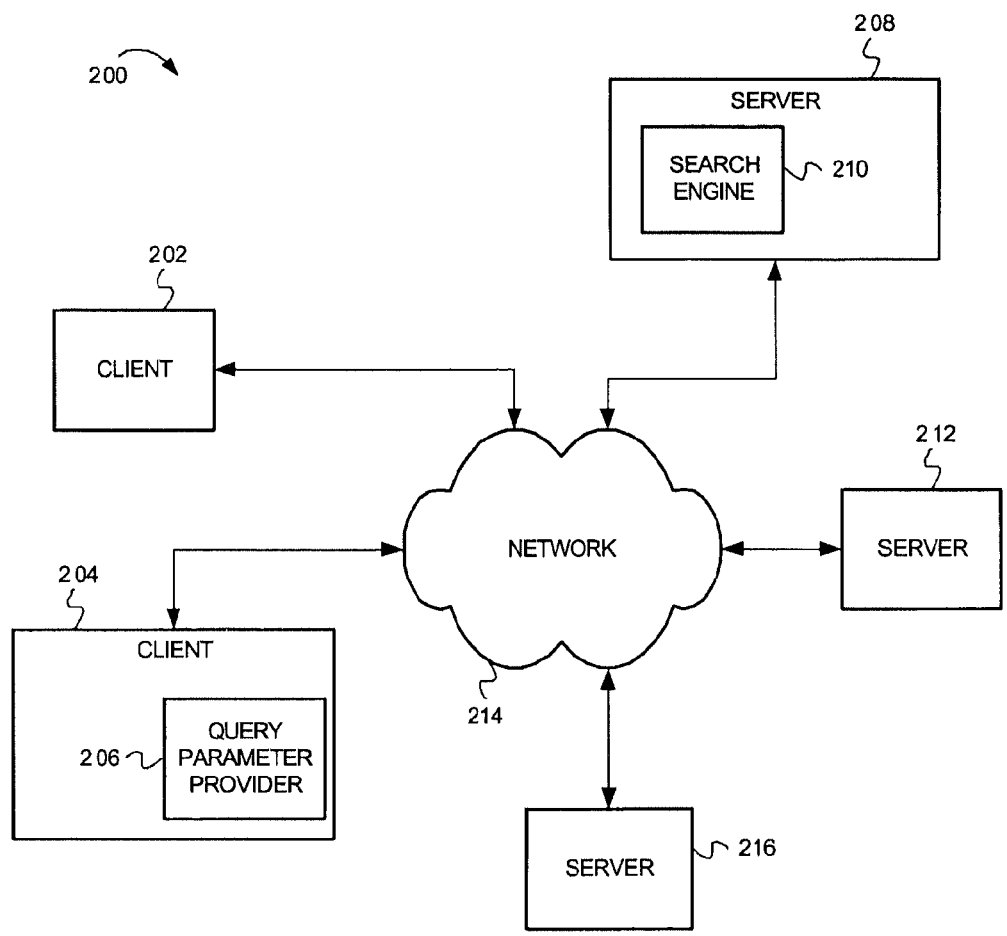
FIG. 2 is a block diagram illustrating a networking environment, according to embodiments of the invention.

FIG. 2 is a block diagram illustrating a networking environment, according to embodiments of the invention. The system 200 can include multiple client devices 202 and 204 connected to multiple servers 208 and 212 via a network 214. The network 214 can be a local area network (LAN), a wide area network (WAN), a telephone network, such as the Public Switched Telephone Network (PSTN), an intranet, the Internet, or a combination of networks. For simplicity, the system 200 shows only two clients 202 and 204 and three servers 208, 212, and 216 connected to the network 214. The client 204 includes a query parameter provider 206 and the server 208 includes a search engine 210. According to embodiments, the query parameter provider 206 transmits query parameters to the search engine 210. In practice, there may be a different number of clients and servers. Also, in some instances, a client may perform the functions of a server and a server may perform the functions of a client device.

The clients 202 and 204 can be mainframes, minicomputers, personal computers, laptops, personal digital assistants, or the like. Additionally, the clients may be capable of connecting to the network 214. The clients 202 and 204 may transmit data over the network 214 or receive data from the network 214 via a wired, wireless, optical, or other connection.

Figure 3:
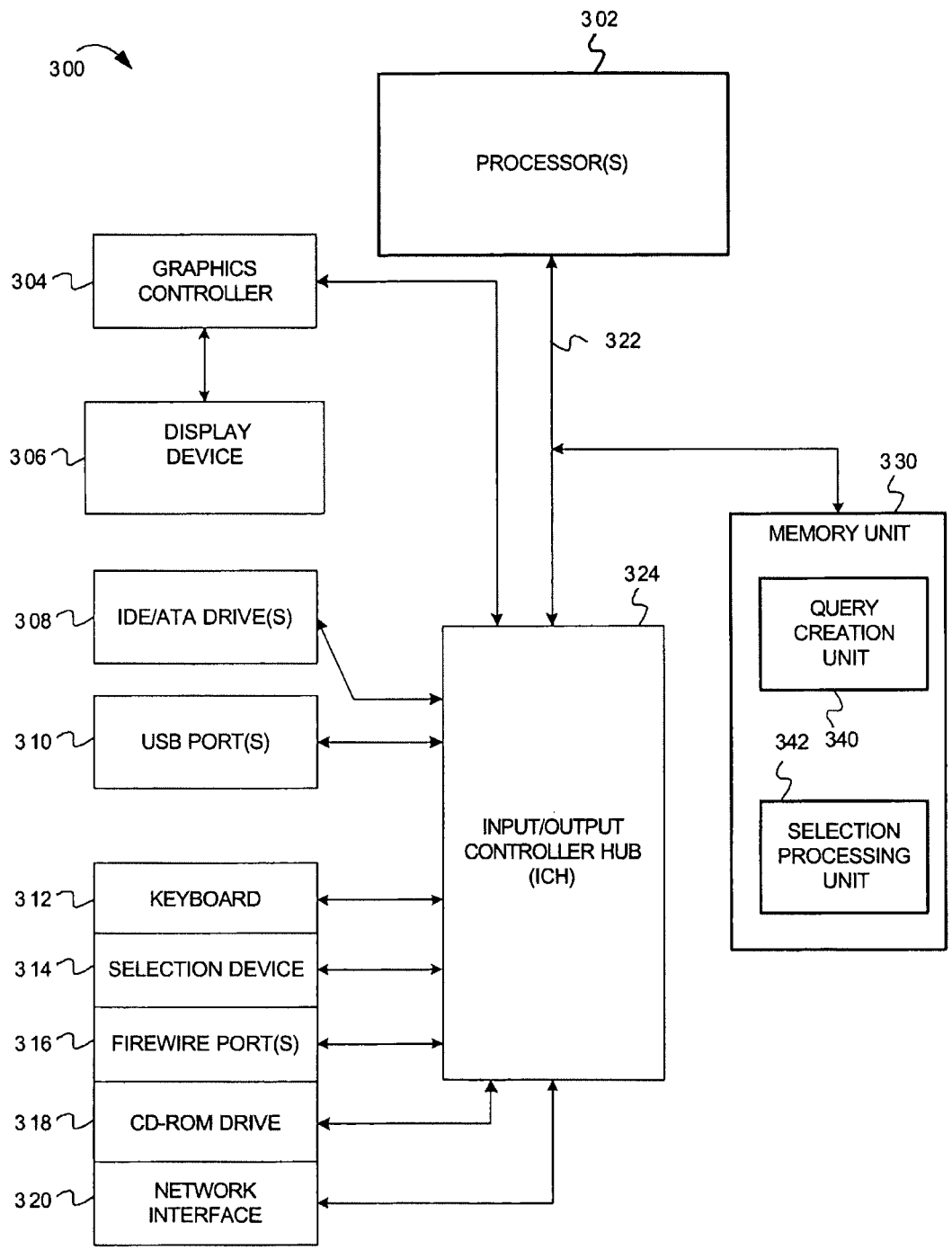
FIG. 3 illustrates an exemplary computer system used in conjunction with certain embodiments of the invention.

FIG. 3 illustrates an exemplary computer system used in conjunction with certain embodiments of the invention. In one embodiment, the computer system of FIG. 3 can be used as a client 204 or server 208.

As shown in FIG. 3, computer system 300 comprises processor(s) 302. The computer system 300 also includes a memory unit 330, processor bus 322, and Input/Output controller hub (ICH) 324. The processor(s) 302, memory unit 330, and ICH 324 are coupled to the processor bus 322. The processor(s) 302 may comprise any suitable processor architecture. The computer system 300 may comprise one, two, three, or more processors, any of which may execute a set of instructions in accordance with embodiments of the present invention.

The memory unit 330 includes an I/O scheduling policy unit 332 and I/O schedulers 334. The memory unit 330 stores data and/or instructions, and may comprise any suitable memory, such as a dynamic random access memory (DRAM), for example. The computer system 300 also includes IDE drive(s) 308 and/or other suitable storage devices. A graphics controller 304 controls the display of information on a display device 306, according to embodiments of the invention.

The input/output controller hub (ICH) 324 provides an interface to I/O devices or peripheral components for the computer system 300. The ICH 324 may comprise any suitable interface controller to provide for any suitable communication link to the processor(s) 302, memory unit 330 and/or to any suitable device or component in communication with the ICH 324. For one embodiment of the invention, the ICH 324 provides suitable arbitration and buffering for each interface.

For one embodiment of the invention, the ICH 324 provides an interface to one or more suitable integrated drive electronics (IDE) drives 308, such as a hard disk drive (HDD) or compact disc read only memory (CD ROM) drive, or to suitable universal serial bus (USB) devices through one or more USB ports 310. For one embodiment, the ICH 324 also provides an interface to a keyboard 312, selection device 314 (e.g., a mouse, trackball, touchpad, etc.), CD-ROM drive 318, and one or more suitable devices through one or more firewire ports 316. For one embodiment of the invention, the ICH 324 also provides a network interface 320 though which the computer system 300 can communicate with other computers and/or devices.

In one embodiment, the computer system 300 includes a machine-readable medium that stores a set of instructions (e.g., software) embodying any one, or all, of the methodologies for providing query parameters to a search engine. Furthermore, software can reside, completely or at least partially, within memory unit 330 and/or within the processor(s) 302.

Exemplary System Architecture

Figure 4:
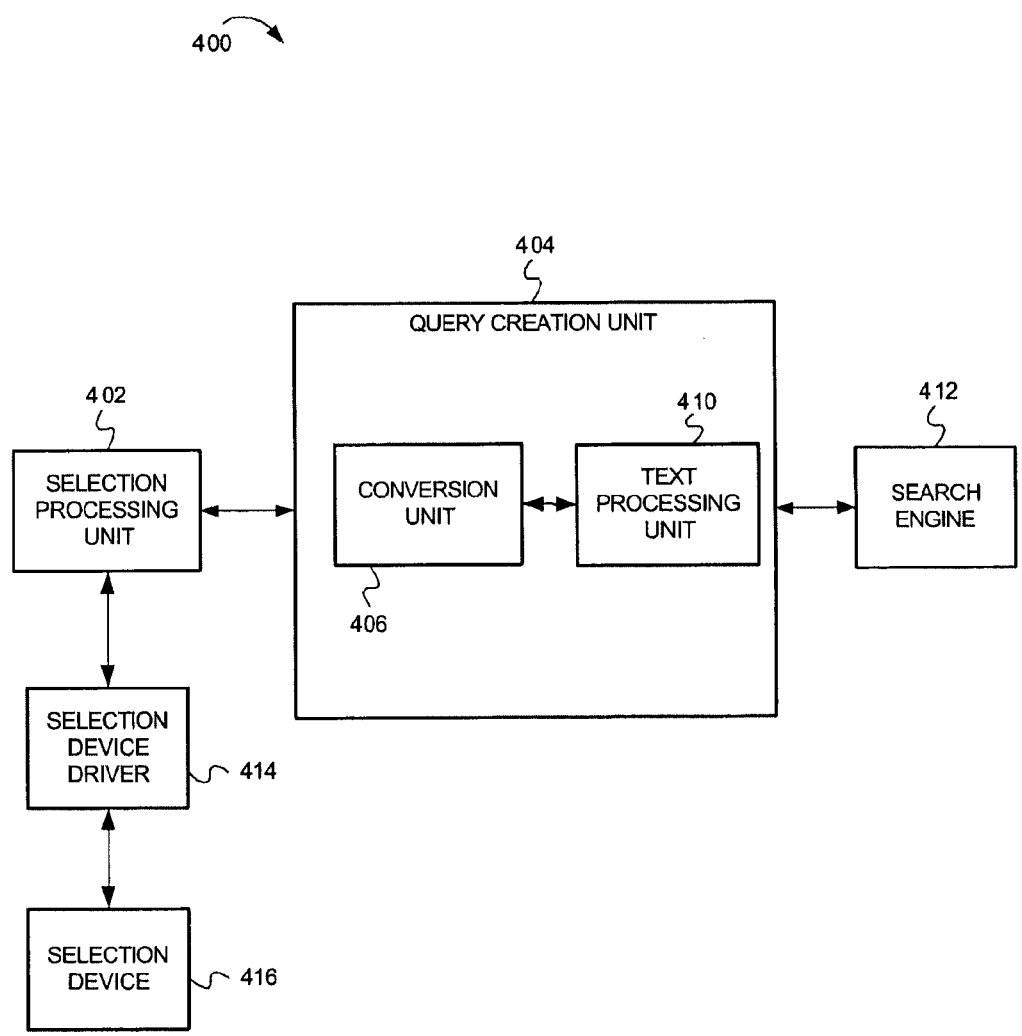
FIG. 4 is a block diagram illustrating a system for providing query parameters to a search engine, according to exemplary embodiments of the invention.

FIG. 4 is a block diagram illustrating a system for providing query parameters to a search engine, according to exemplary embodiments of the invention. As shown in FIG. 4, the system 400 includes a selection device 416 connected to a selection device driver 414. The selection device driver 414 is connected to a selection processing unit 402. According to embodiments, the selection device 416 can be a mouse, trackball, touchpad, trackpoint, keyboard, or any other input device suitable for selecting text and image data in a GUI. The selection devices can be wireless, mechanical, and/or optical. According to embodiments, the selection device driver 414 can be software or hardware for translating signals from the selection device 416 into data suitable for processing by the selection processing unit 402.

The selection processing unit 402 is connected to a query creation unit 404. The query creation unit 404 includes a conversion unit 406 for converting image data into a query. In one embodiment, the conversion unit 406 can convert image data into a query using optical character recognition. The query creation unit 404 also includes a text processing unit 410 for modifying the query based on image data or text data appearing in a GUI. In one embodiment, the system 400 does not include the text processing unit 410. The query creation unit 404 is connected to a search engine 412. According to embodiments, the search engine can reside on a local or remote computer and it can search local and/or remote data. According to embodiments, the search engine can be an Internet-based search engine, such as Google™, available from Google, Inc. of Mountainveiw, Calif.

System Operations

This section describes operations performed by embodiments of the invention. In certain embodiments, the operations are performed by instructions residing on machine-readable media (e.g., software), while in other embodiments, the methods are performed by hardware or other logic (e.g., digital logic).

Figure 7:
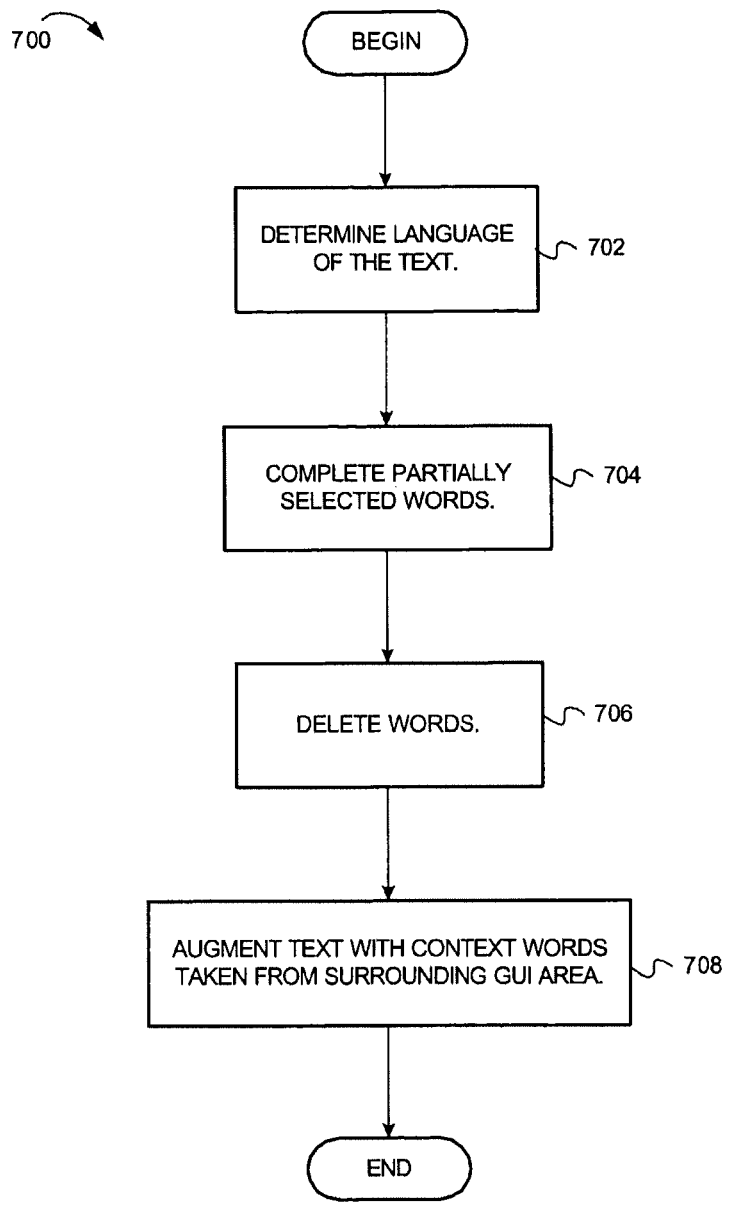
FIG. 7 is a flow diagram illustrating operations for processing text, according to exemplary embodiments of the invention.
Figure 8:
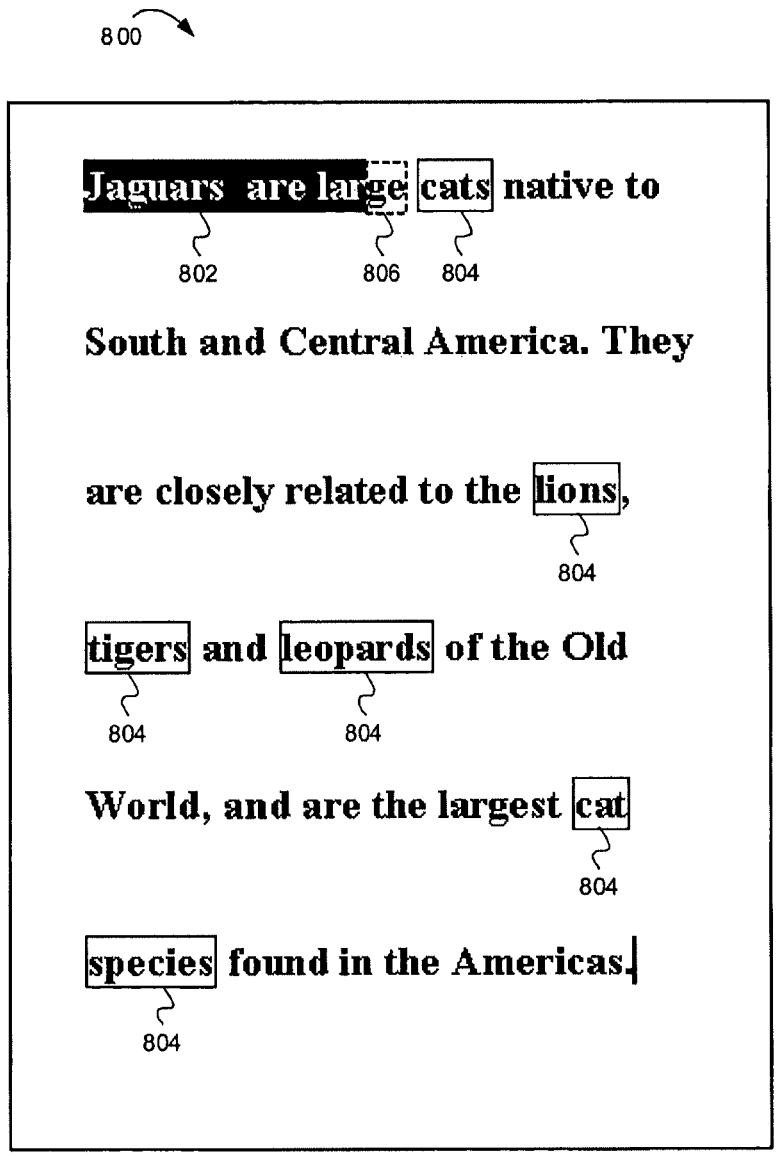
FIG. 8 is a block diagram illustrating creating a query parameter set using text from a GUI, according to exemplary embodiments of the invention.

In this section, FIGS. 5-7 will be discussed. In particular, FIG. 5 describes operations for processing a selection request, while FIG. 6 describes operations for creating query parameters based on the selection request. FIGS. 7 and 8 describe operations for using additional non-selected data when creating the query parameter.

Figure 5:
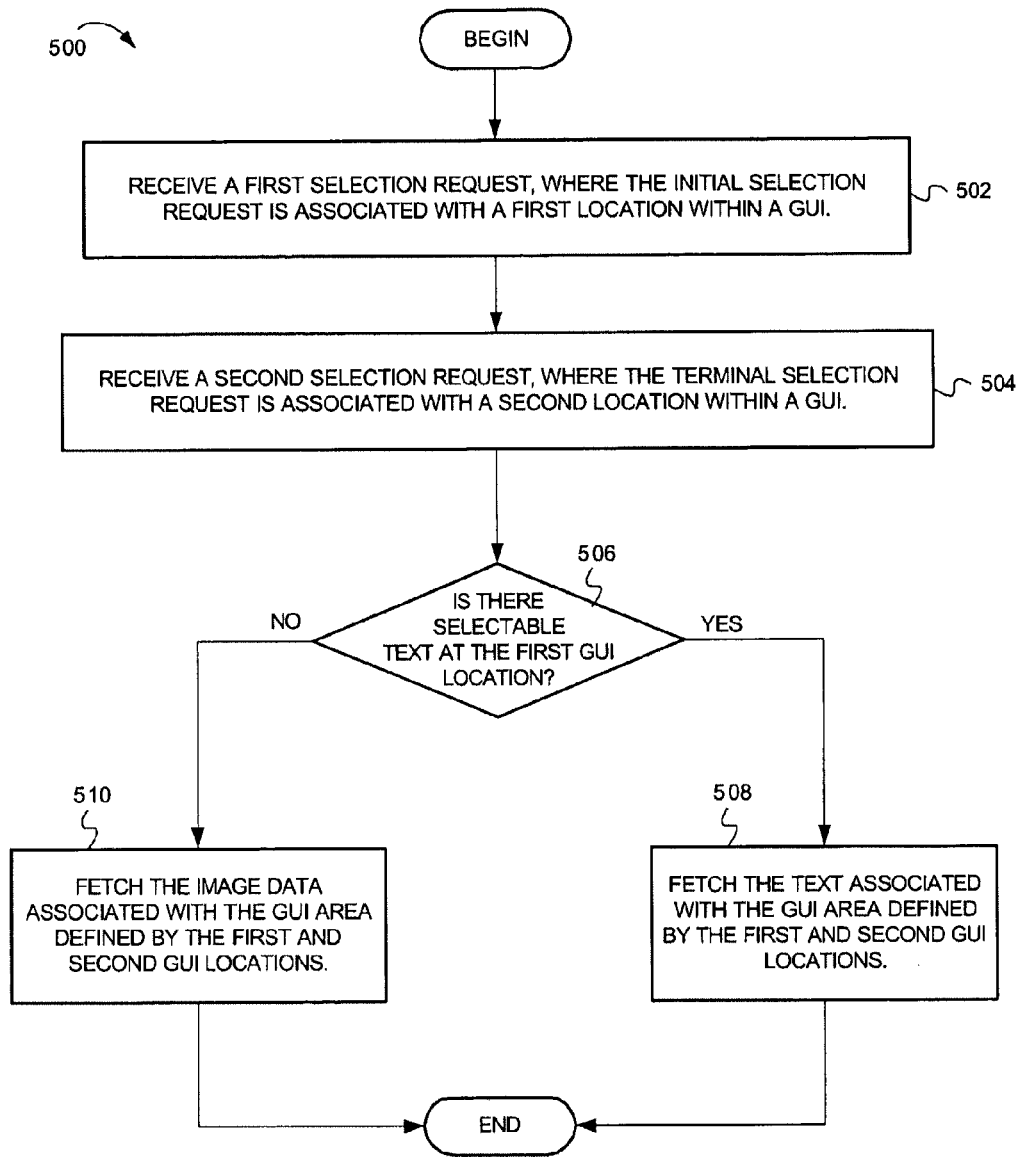
FIG. 5 is a flow diagram illustrating operations for receiving and processing a selection request, according to exemplary embodiments of the invention.

FIG. 5 is a flow diagram illustrating operations for receiving and processing a selection request, according to exemplary embodiments of the invention. The flow diagram 500 will be described with reference to the exemplary system of FIG. 4. The flow diagram 500 commences at block 502.

At block 502, the selection processing unit 402 receives a first selection request from the selection device 416 via the selection device driver 414. The first selection request is associated with a first location within a GUI. In one embodiment, the first selection request can be a down-mouse-click received from a first location on an application program, such as a word processor, browser, spreadsheet, etc. The flow continues at block 504.

At block 504, the selection processing unit 402 receives a second selection request from the selection device 416 via the selection device driver 414. The second selection request is associated with a second location on the GUI. In one embodiment, the second selection request can be an up-mouse-click received from a second location on the application program. In one embodiment, the down-mouse-click and up-mouse-click together constitute a single mouse-click. In one embodiment, the first and second locations can be used to define a selection area (on the GUI) that includes search data, such as image data and text. The flow continues at block 506.

At block 506, the selection processing unit 402 determines whether there is selectable text at the first GUI location. According to embodiments, the selection processing unit 402 can determine whether there is selectable text at the first GUI location by querying the application program that occupies the first GUI location or by querying the operating system. If there is selectable text at the first GUI location, the flow continues at block 508. Otherwise, the flow continues at block 510.

At block 508, the selection processing unit 402 fetches the selectable text associated with a GUI area defined by the first and second locations. In one embodiment, the first and second locations define a rectangular selection area on the GUI, where the first location defines one of the rectangle's upper vertices and the second location defines one of the rectangle's lower vertices. According to embodiments, the selection processing unit 402 can fetch selectable text from an operating system clip-board or from another memory location. From block 508, the flow ends.

At block 510, the selection processing unit 402 fetches image data associated with an area of the GUI defined by the first and second locations. As noted above, in some embodiments, the first and second locations define a rectangular selection area with a GUI. The selection processing unit 402 can fetch data appearing in the rectangular selection area. From block 510, the flow ends.

Although the flow diagram 500 describes fetching either text or image data from a GUI selection area, other embodiments fetch both text and image data from a GUI selection area. In one embodiment, after receiving the first and second selection requests, the selection processing unit 402 fetches both text and image data appearing in the GUI selection area.

Figure 6:
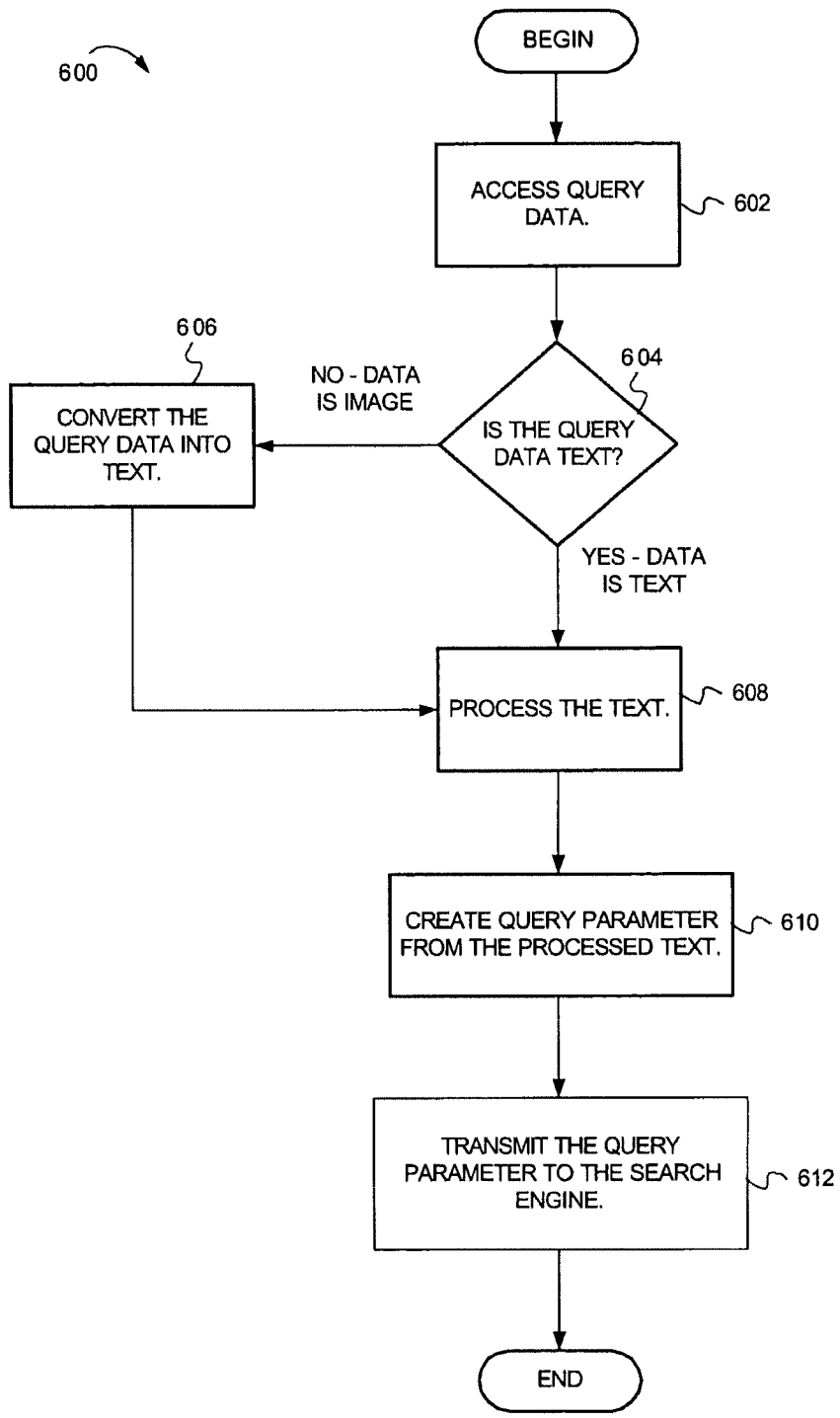
FIG. 6 is a flow diagram illustrating operations for creating a set of one or more query parameters, according to exemplary embodiments of the invention.

While FIG. 5 describes operations for receiving and processing a selection request, FIG. 6 describes creating query parameters based on data associated with the selection request.

FIG. 6 is a flow diagram illustrating operations for creating a set of one or more query parameters, according to exemplary embodiments of the invention. The flow diagram 600 will be described with reference to the exemplary system shown in FIG. 4. The flow diagram 600 commences at block 602.

At block 602, the query creation unit 404 accesses query data. In one embodiment, the query data can be text data and/or image data fetched by the selection processing unit 402, as a result of operations of flow diagram 500 (See FIG. 5). However, alternative embodiments do not require that the text data and/or image data be fetched in any particular fashion. The flow continues at block 604.

At block 604, the query creation unit 404 determines whether the query data is text data. If the query data is text data, the flow continues at block 608. Otherwise, the flow continues at block 606.

At block 606, the conversion unit 406 converts the query data into text. In one embodiment, the conversion unit 406 can use optical character recognition to convert image data into text. The flow continues at block 608.

At block 608, the text processing unit 410 processes the text. In one embodiment, the text processing unit 410 modifies the text by adding characters to or deleting characters from the text. The discussion of FIGS. 7 and 8 below describes additional operations for processing the text. The flow continues at block 610.

At block 610, the text processing unit 410 creates a set of one or more query parameters based on the processed text. In one embodiment, the text processing unit 410 can create a query parameter from the converted and processed text. In one embodiment, the text processing unit 410 can create another query parameter based on the language of the converted text (see discussion of block 702 below). In one embodiment, the text processing unit 410 can create yet another query parameter based on context words taken from the GUI (see discussion of block 708 below). The flow continues at block 612.

At block 612, the text processing unit 410 transmits the set of one or more query parameters to the search engine 412. In one embodiment, the text processing unit 410 inserts the processed text into a URL and transmits the URL to a search engine via a browser. From block 612, the flow ends.

The discussion of FIGS. 5 and 6 above described operations for receiving a selection request and creating a set of one or more query parameters. In one embodiment, creating a query parameter set involves processing text (see block 608 of FIG. 6). In the discussion below, FIGS. 7 and 8 describe more detailed operations for processing text, according to embodiments of the invention.

FIG. 7 is a flow diagram illustrating operations for processing text, according to exemplary embodiments of the invention. The operations of the flow diagram 700 will be described with reference to the exemplary system of FIG. 4. The operations of the flow diagram 700 will also be described with reference to FIG. 8 (see discussion of blocks 704, 706, and 708 below). The flow diagram 700 commences at block 702.

At block 702, the text processing unit 410 determines a language of the text. For example, the text processing unit 410 can determine whether the text is English, French, Spanish, Chinese, etc. The flow continues at block 704.

At block 704, the text processing unit 410 completes partial words. In one embodiment, the text processing unit 410 can complete partial words using unselected text data and/or image data appearing in the GUI. FIG. 8 helps illustrate this concept.

FIG. 8 is a block diagram illustrating creating query parameters using text from a GUI, according to exemplary embodiments of the invention. FIG. 8 includes a text passage 800, which includes a selected text segment 802. The selected text segment 802 includes the characters "Jaguars are lar". The passage 800 also includes an unselected text segment 806, which includes the characters "ge".

According to one embodiment, the text processing unit 410 can append characters to a selected text string using unselected text segments from the GUI. For example, the text processing unit 410 could complete the string "Jaguars are lar" 802 by appending it with "ge" 806, forming "Jaguars are large". Completing words may result in query parameters that produce more accurate searches.

Referring back to FIG. 7, from block 704, the flow continues at block 706.

At block 706, the text processing unit 410 deletes certain words from the text. In one embodiment, the text processing unit 410 can delete "stop words", such as articles, prepositions, and other common words. Deleting words from the text may result in query parameters that produce more accurate search results. The flow continues at block 708.

At block 708, the text processing unit 410 augments the text with context words. In one embodiment, the text processing unit 410 can augment the text with unselected text from the GUI. For example, referring to FIG. 8, the text processing unit can augment the query "Jaguars are large" with one or more unselected context words 804. Because "Jaguars" can relate to cats or automobiles, the text processing unit 410 can search for unselected context words in the passage 800. The text processing unit 410 can add one or more context words 804 to the query. For example, the text processing unit 410 can add "cats" to the query. Adding context words may result in query parameters that produce more accurate search results. From block 708, the flow ends.

Although the flow diagram 700 describes a sequence of text processing operations, embodiments of the invention can employ one or more of the text processing operations described above.

Exemplary Implementation

Figure 10:
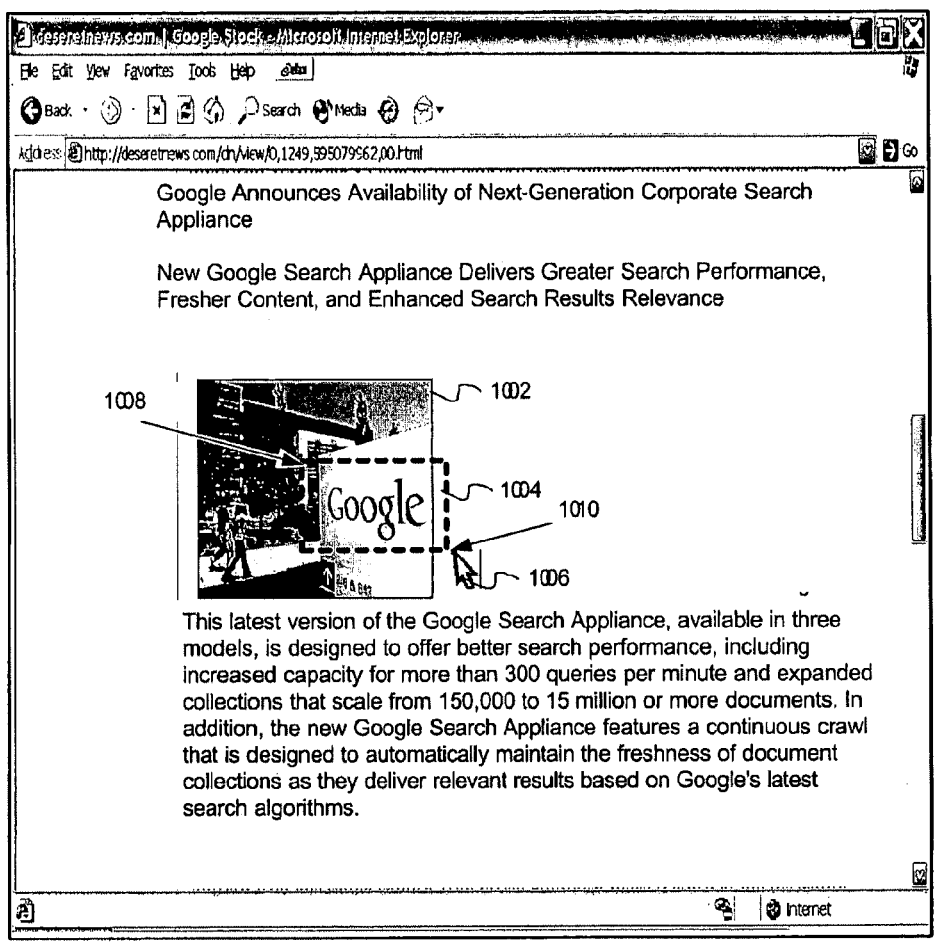
FIG. 10 is a screenshot illustrating image selection in a GUI, according to exemplary embodiments of the invention.
Figure 11:
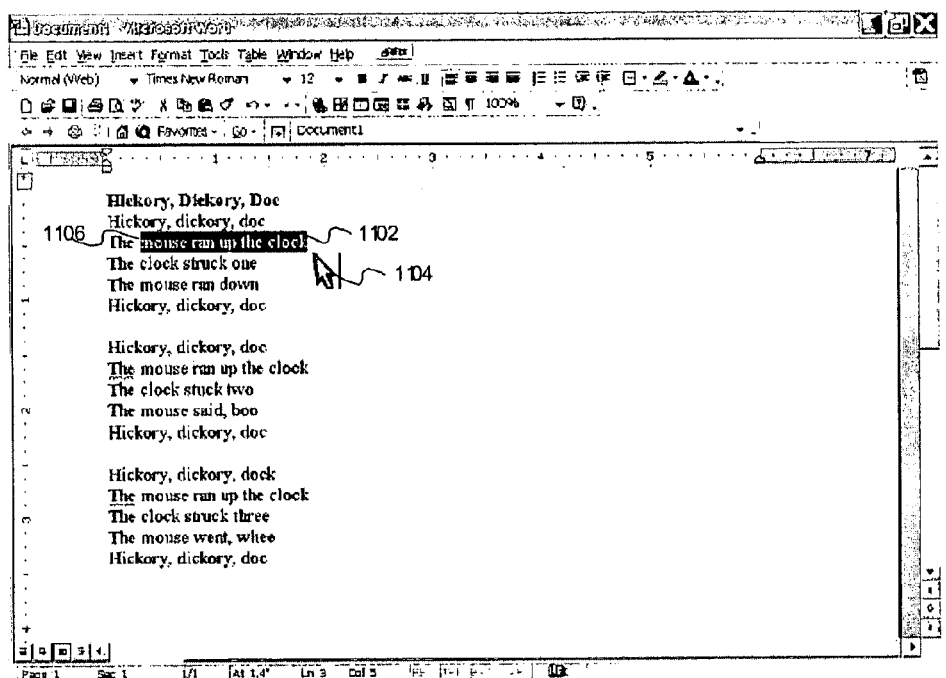
FIG. 11 is a screenshot illustrating text selection in a GUI, according to exemplary embodiments of the invention.
Figure 12:
FIG. 12 is a screenshot illustrating inserting a query parameter set into a browser address bar.

In this section, an exemplary implementation will be described. While this section describes an exemplary implementation, other embodiments of the invention can be implemented differently. In this section, FIG. 9 describes exemplary operations for creating a query parameter, whereas FIGS. 10-12 show screenshots of a user interface.

Figure 9:
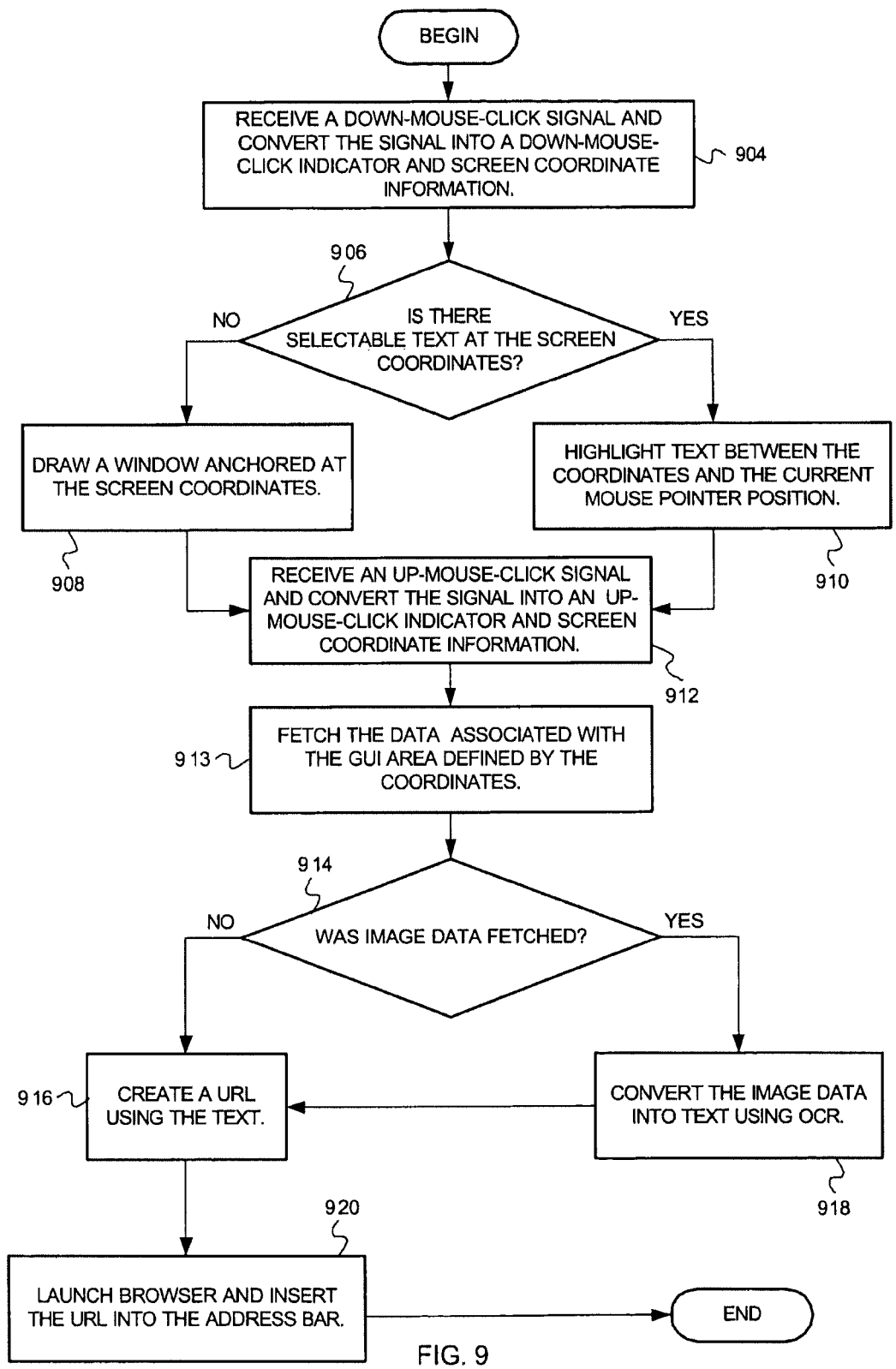
FIG. 9 is a flow diagram illustrating operations for providing a query parameter set to a search engine, according to exemplary embodiments of the invention.

FIG. 9 is a flow diagram illustrating operations for providing a query parameter set to a search engine, according to exemplary embodiments of the invention. FIG. 9 will be described with reference to the exemplary system of FIG. 4. In the following discussion, the selection device 416 will be referred to as a mouse and the selection device driver 414 will be referred to as a mouse driver. The flow diagram 900 commences at block 904.

At block 904, the mouse generates a down-mouse-click signal (in response to a user click) and the mouse driver converts the signal into a down-mouse-click indicator and screen coordinate information. The screen coordinate information can include an (x,y) coordinate pair representing a location of a mouse pointer on a GUI. The down-mouse-click indicator can be a data structure suitable for processing by the selection processing unit 402. In one embodiment, the mouse can be a four-button mouse for which a button has been configured for receiving selection input for a query parameter creation system. The flow continues at block 906.

At block 906, the selection processing unit 402 determines whether there is selectable text at the screen coordinates. If there is selectable text at the screen coordinates, the flow continues at block 910. Otherwise, the flow continues at block 908.

At block 908, the selection processing unit 402 draws a resizable window anchored at the screen coordinates. FIG. 10 helps to illustrate this concept. FIG. 10 is a screenshot illustrating image selection in a GUI, according to exemplary embodiments of the invention. In FIG. 10, in response to input from the mouse, the selection processing unit 402 creates a resizable window 1004 (i.e., a selection area) anchored at a screen point 1008. The selection processing unit 402 resizes the window 1004 based on the position of the mouse pointer 1006. The flow continues at block 912.

At block 910, the selection processing unit 402 highlights text between the coordinates and the current mouse pointer position. FIG. 11 helps to illustrate this concept. FIG. 11 is a screenshot illustrating text selection in a GUI, according to exemplary embodiments of the invention. In FIG. 11, the selection processing unit 402 highlights text 1102 between a first screen point 1106 and the mouse pointer 1104. Referring to FIG. 9, the flow continues at block 912.

At block 912, in response to a user up-click, the mouse generates an up-mouse-click signal and the mouse driver converts the signal into a up-mouse-click indicator and screen coordinate information. The flow continues at block 913.

At block 913, the selection processing unit 402 fetches data associated with the GUI area defined by the coordinates. For example, referring to FIG. 10, the selection processing unit 402 fetches the image data appearing in the window 1004. As another example, referring to FIG. 11, the selection processing unit 402 fetches the selected text 1102 (i.e., the selection processing unit 402 fetches "mouse ran up the clock"). In one embodiment, when the screen coordinates indicate that the down-mouse click and up-mouse click occurred at the same GUI location, the selection processing unit 402 can fetch a single word closest to the coordinates. In one embodiment, the selection processing unit 402 can perform OCR on a GUI area surrounding the screen coordinates. After performing the OCR, the selection unit processing 402 can then fetch the word closest to the coordinates. Alternatively, the selection processing unit can fetch any number of words from an area surrounding the coordinates. The flow continues at block 914.

At block 914, the conversion unit 406 determines whether the data is image data. If the data is image data, the flow continues at block 918. Otherwise, the flow continues at block 916.

At block 918, the conversion unit 406 converts the image data into text using optical character recognition. The flow continues at block 916.

At block 916, the query creation unit 404 creates a query parameter using the text and the query creation unit 404 creates a universal resource locator (URL) based on the query parameter. For example, the query creation unit 404 creates a query parameter using "the mouse ran up the clock". Additionally, the query creation unit 404 creates the following URL based on the query parameter: http://www.google.com/ search?hl=en&ie=UTF-8&q=mouse+ran+up+the+clock
The flow continues at block 920.

At block 920, the query creation unit 404 launches a browser and inserts the URL into the browser's address bar. FIG. 12 illustrates this concept. FIG. 12 is a screenshot illustrating inserting a query parameter set into a browser address bar. In FIG. 12, a browser 1200 is launched and a URL including the query parameter from above is inserted into the browser's address bar. Launching the browser and inserting the URL into the browser's address bar transmits the query parameter to a search engine. From block 920, the flow ends.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, operations of the flow diagrams could be performed by embodiments other than those discussed with reference to the block diagrams, and embodiments discussed with references to the block diagrams could perform operations different than those discussed with reference to the flow diagrams. Moreover, although the flow diagrams depict serial operations, certain embodiments could perform certain of those operations in parallel, while other embodiments omit some operations altogether.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method for providing query parameters to a search engine, comprising:
   receiving, by one or more computers, data specifying two or more locations of a graphical user interface that were included in a user selection area;
   determining, based on the received data and by the one or more computers, that a first portion of text is included in the user selection area;
   creating, by the one or more computers, a textual search query based at least in part on the first portion of text;
   identifying, by the one or more computers, a second portion of text that is presented in the graphical user interface, but is not included in the user selection area;
   modifying, by the one or more computers, the textual search query based at least in part on the second portion of text, wherein the modifying comprises:
   including, in the textual search query, a word that differs from words included in the first and second portions of text and describes a context of the second portion of text; and
   submitting, by the one or more computers, the modified textual search query to the search engine.

2. The method of claim 1, wherein the modifying the textual search query comprises appending the second portion of text that is not included in the user selection area to the first portion of text that is included in the selection area.

3. The method of claim 1, further comprising:
   determining a context associated with the first portion of text that is included in the user selection area based, at least in part, on content that is not included in the user selection area;
   identifying a query term based on the determined context associated with the first portion of text; and
   including the query term in the textual search query.

4. The method of claim 1, wherein:
   determining that the first portion of text is included in the user selection area comprises determining that an image located in the user selection area includes a visual representation of text; and
   the creating the textual search query being based, at least in part, on the visual representation of text.

5. The method of claim 1, wherein the receiving the data specifying the two or more locations of the graphical user interface that were included in the user selection area comprises receiving input specifying that a computer mouse performed a click-and-drag operation.

6. A system for providing query parameters to a search engine, comprising:
   a data storage device; and
   one or more computers that interact with the data storage device and execute instructions that cause the one or more computers to perform operations comprising:
   receiving data specifying two or more locations of a graphical user interface that were included in a user selection area;
   determining, based on the received data, that a first portion of text is included in the user selection area;
   creating a textual search query based at least in part on the first portion of text;
   identifying a second portion of text that is presented in the graphical user interface, but is not included in the user selection area;
   modifying the textual search query based at least in part on the second portion of text, wherein the modifying comprises:
   including, in the textual search query, a word that differs from words included in the first and second portions of text and describes a context of the second portion of text; and
   submitting, by one or more computers, the modified textual search query to the search engine.

7. The system of claim 6, wherein the modifying the search query comprises appending the second portion of text that is not included in the user selection area to the first portion of text that is included in the selection area.

8. The system of claim 6, wherein the instructions cause the one or more computers to perform operations further comprising:
   determining a context associated with the first portion of text that is included in the user selection area based, at least in part, on content that is not included in the user selection area;

identifying a query term based on the determined context associated with the first portion of text; and including the query term in the textual search query.

9. The system of claim 6, wherein:

determining that the first portion of text is included in the user selection area comprises determining that an image located in the user selection area includes a visual representation of text; and comprises the creating the textual search query being based, at least in part, on the visual representation of text.

10. The system of claim 6, wherein the receiving the data specifying the two or more locations of the graphical user interface that were included in the user selection area comprises receiving input specifying that a computer mouse performed a click-and-drag operation.

11. A non-transitory computer readable medium storing instructions that when executed by one or more computers cause the one or more computers to perform operations for providing query parameters to a search engine, comprising:

receiving data specifying two or more locations of a graphical user interface that were included in a user selection area;

determining, based on the received data, that a first portion of text is included in the user selection area;

creating a textual search query based at least in part on the first portion of text;

identifying a second portion of text that is presented in the graphical user interface, but is not included in the user selection area;

modifying the textual search query based at least in part on the second portion of text, wherein the modifying comprises:

including, in the textual search query, a word that differs from words included in the first and second portions of text and describes a context of the second portion of text; and submitting, by one or more computers, the modified textual search query to the search engine.

12. The computer readable medium of claim 11, wherein the modifying the search query comprises appending the second portion of text that is not included in the user selection area to the first portion of text that is included in the selection area.

13. The computer readable medium of claim 11, wherein the instructions cause the one or more computers to perform operations further comprising:

determining a context associated with the first portion of text that is included in the user selection area based, at least in part, on content that is not included in the user selection area;

identifying a query term based on the determined context associated with the first portion of text; and including the query term in the textual search query.

14. The computer readable medium of claim 11, wherein:

determining that the first portion of text is included in the user selection area comprises determining that an image located in the user selection area includes a visual representation of text; and the creating the textual search query being based, at least in part, on the visual representation of text.

15. The computer readable medium of claim 11, wherein the receiving the data specifying the two or more locations of the graphical user interface that were included in the user selection area comprises receiving input specifying that a computer mouse performed a click-and-drag operation.

\* \* \* \* \*